United States Patent [19]
Berke

[11] Patent Number: 4,501,835
[45] Date of Patent: * Feb. 26, 1985

[54] POLYACRYLIC ACID/CHITOSAN POLYELECTROLYTE COMPLEX

[75] Inventor: Carl M. Berke, Cambridge, Mass.

[73] Assignee: Polaroid Corporation, Cambridge, Mass.

[ * ] Notice: The portion of the term of this patent subsequent to Apr. 3, 2001 has been disclaimed.

[21] Appl. No.: 549,833

[22] Filed: Nov. 9, 1983

Related U.S. Application Data

[63] Continuation-in-part of Ser. No. 355,679, Mar. 8, 1982, abandoned.

[51] Int. Cl.³ .......................... C08L 5/08; B01D 13/00
[52] U.S. Cl. ..................................... 524/32; 524/502; 523/206; 424/16; 424/27; 424/81; 424/180; 424/DIG. 7; 210/654

[58] Field of Search ...................... 524/27, 29, 32, 460, 524/502; 523/205, 206; 528/310, 342; 260/112.5 R; 106/215; 424/16, 27, 78, 81, 180, 361, DIG. 7; 210/634, 653, 654, 433 L

[56] References Cited

U.S. PATENT DOCUMENTS 3,276,598 10/1966 Michaels et al. .................... 210/500
3,962,158 6/1976 Mima et al. ........................... 524/43
4,301,067 11/1981 Koshugi ........................ 260/112.5 R
4,440,541 3/1984 Berke ..................................... 8/645

OTHER PUBLICATIONS

"Chitin" by R. A. A. Muzzarelli, Pergamon Press, 1977, pp. 69 and 257.

Primary Examiner—John Kight
Assistant Examiner—Nathan M. Nutter
Attorney, Agent, or Firm—Philip G. Kiely

[57] ABSTRACT

A novel composition of matter comprising a polyacrylic acid/chitosan complex. This complex is particularly useful as a membrane or filter.

34 Claims, No Drawings

POLYACRYLIC ACID/CHITOSAN POLYELECTROLYTE COMPLEX

CROSS-REFERENCE TO RELATED APPLICATIONS

This application is a continuation-in-part of copending application Ser. No. 355,679, filed Mar. 8, 1982, now abandoned.

BACKGROUND OF THE INVENTION

Polyelectrolyte complexes are substances which are ionically crosslinked hydrogels formed by the coreaction of highly and oppositely charged electrolytes. While polyelectrolytes can be formed from natural polymers, such as gums, gelatin and the like, interest has centered on polyelectrolyte complexes of synthetic polymers. Of greatest commercial interest is a polyelectrolyte complex formed between sodium polystyrene sulfonate and polyvinylbenzyltrimethylammonium chloride. These materials are characterized as a strongly acidic polyanion (sodium polystyrene sulfonate) and a strongly basic polycation (polyvinylbenzyltrimethylammonium chloride). While it has been stated that weak acid—weak base polyelectrolytes can interact to form what may be polyelectrolyte complexes, it is also stated that, "However, the resulting hydrogels are not as strong mechanically, their degree of hydration is more difficult to control, and they are thermally and chemically less stable than PEC hydrogels prepared from polymeric salts of strong acids and strong bases." (Kirk-Othmer Encyclopedia of Chemical Technology, Vol. 16, 1977 p. 118).

While attention, therefore, has centered on the above described strong acid-strong base type of complex, these materials have been found to be difficult to handle. U.S. Pat. No. 3,276,598 is directed to a method for forming this film by the reaction at the interface of aqueous solutions of sodium polystyrene sulfonate and polyvinylbenzyltrimethylammonium chloride. The thus-formed film blocks further interaction rendering the process self-limiting with the film thickness only about 200 A.

To produce solutions of such polyelectrolyte complexes so that films or membranes can be cast therefrom require ternary solvent compositions of inorganic electrolyte, polar organic solvent and water, such as calcium nitrate decahydrate, dioxane and water. See for example, U.S. Pat. Nos. 3,467,604 and 3,271,496. Employing such solvent systems would result in processing problems due to incompatibilities with other systems. For example, the aforementioned solvent systems preclude film coating by casting and drying since the nonvolatile solvent components cannot be removed without further processing.

Chitin and chitosan films and membranes are known to the art, both as the sole component and in combination with another material; for example, membranes of chitosan and polyvinyl alcohol, chitosan and cellulose acetate and sulfoethyl chitosan. Chitin membranes are generally prepared by acetylating chitosan membranes. See for example, R. A. A. Muzzarelli, Chitin, Pergamon Press, 1977.

Japanese Application No. 155568/68, application date Dec. 16, 1978 (Laid open No. 81705/80, Laid open date June 20, 1980) is directed to a method for manufacturing chitosan film by formig an acidic chitosan solution, adding propylene glycol to the solution, forming a film, treating with alkali and then removing the polyethylene glycol with water.

Kikuchi and Fukuda, in Die Makromol. Chem., 175, 3573 (1974) describe a polyelectrolyte complex of sodium dextran sulfate and chitosan. However, it is stated that there is no solvent available for such a complex and, therefore films cannot be prepared.

Fukuda, in Bull. Chem. Soc Jap., b 53, 837 (1980) describes a polyelectrolyte complex of chitosan and sodium carboxymethyl cellulose. This complex is only soluble at a pH of less than 2 and only glacial formic acid is disclosed as a solvent.

U.S. Pat. No. 4,301,067, issued Nov. 17, 1981, is directed to a poly-ion complex comprising chitin or N-acylchitosan derivative having carboxymethyl and polyelectrolyte. The N-acyl derivative of chitin or chitosan is necessary to obtaining solubility. In this manner high molecular polyelectrolyte can be employed to form the poly-ion complex. The poly-ion complex is described as soluble in aqueous salt solutions and in such a dissolved state is shaped into film-like or filter-like bodies and then insolubilization is carried out by desalting treatment.

SUMMARY OF THE INVENTION

The present invention is directed to a novel composition of matter comprising a polyacrylic acid/chitosan polyelectrolyte complex. The complex is formed in an aqueous acidic solution and can be employed to form membranes and films. It is critical that the polyacrylic acid be low molecular weight (weight average), i.e., less than 10,000.

DETAILED DESCRIPTION OF THE INVENTION

The novel polyelectrolyte complex of the present invention is formed from a combination of weak acid—weak base polyelectrolytes. Contrary to what is expected in the art the complex of the present invention can be formed into mechanically strong, free-standing films or anisotropic membranes.

The complexes of the present invention are prepared by combining, with mixing, an acidic solution of low molecular weight polyacrylic acid and an acidic solution of chitosan. A clear homogeneous amber solution is produced.

The term "chitosan", as used herein, is intended to refer to acid soluble, at least partially deacetylated, unsubstituted chitin. Preferably, the degree of deacetylation is at least 75%, more preferably in excess of 85%. Although chitosan with a leseer degree of deacetylation can be employed, as the degree of deacetylation decreases and approaches chitin, the chitosan requires more acidic conditions for dissolution.

Any suitable mineral or organic acid may be employed to solubilize the polyacrylic acid and chitosan, provided the pH of the solution is below about 4. Suitable acids include sulfuric acid, hydrochloric acid, formic acid and acetic acid.

A self-supporting film may be formed from the solution of the complex by applying a coating on a suitable base or support. Any suitable coating means known to the art may be employed, including, but not limited to, slot-head coating, wire-wound rod and curtain coating. The particular base or support is not critical, although whether or not the film is to be stripped from the support should be considered in the selection of the support. The coating of the complex is dried, preferably at elevated temperatures to provide an optically clear, colorless film which, if desired, can be stripped from the support. Substantially any thickness film can be prepared. If the support is intended to act as a support for the membrane, a porous or permeable material may be employed and, in such a case, the film would not be stripped therefrom.

Anisotropic membranes can be prepared by phase inversion techniques known to the art employing the complex of the present invention. An anisotropic membrane can be prepared by coating, for example, a solution of the complex on a support. The fluid coating is allowed to air dry until a thin skin forms on the surface, immediately after which, the film is immersed in dilute alkali, e.g., 0.1N sodium hydroxide or 0.5N sodium acetate to coagulate the complex and then washed with water to remove the alkali. Care should be taken that the concentration of the alkali and/or time of contact not be sufficient to extract the polyacrylic acid.

If desired, as a coating aid, a non-ionic surfactant may be employed. The specific surfactant is not critical and conventional surfactants known to the art may be employed. The level of surfactant may range from about 0.1% by weight to about 5% by weight, of solution, preferably about 0.1% by weight depending upon the wetability of the surface of the particular support employed.

In a preferred embodiment, a plasticizer is employed in the film or membrane prepared by the present invention. The plasticizer may be incorporated into the film by addition to the solution prior to casting the film or, alternatively, the cast film or membrane may be post treated by imbibition with the plasticizer. A particularly preferred class of plasticizers is the polyols. As example of suitable polyols mention may be made of glycerol, glucose, pentaerythritol, d-mannitol, ethylene glycol, propylene glycol (polymeric). Glycerol is a particularly preferred plasticizer. The plasticizer level is not critical and may be employed satisfactorily over a wide range. In one embodiment the plasticizer is employed at a level of about 1% by weight, of polyelectrolyte solution.

It should be understood that a plasticizer is not critical. However, if the drying conditions employed in the preparation of the film or membranes are such that the film would embrittle, the use of a plasticizer would be necessary.

Polyacrylic acid of substantially any molecular weight less than about 10,000 (weight average) may be employed in forming the complexes of the present invention. As the molecular weight of the polyacrylic acid increases, a higher concentration of acid is necessary to maintain solubility of the complex. The higher the molecular weight of the polyacrylic acid, the greater the strength of the film or membrane. Preferably, polyacrylic acid having a molecular weight about 5,000 is employed. Acetic acid is preferably employed as the solvent. The term "polyacrylic acid" as used herein is intended to include both polyacrylic acid and polymethacrylic acid.

That a polyelectrolyte complex is formed is evidenced by infra-red analysis of the complex which shows no difference from the materials separately, indicating that no chemical change has occurred. Also, while the polyacrylic acid and chitosan are both soluble in dilute acid, when mixed together they become insoluble, indicating that a change has occurred.

Compared to chitosan films described above in the background of the invention, the novel films of the present invention exhibit enhanced stability to acid.

The following non-limiting example illustrates the preparation of a polyelectrolyte complex within the scope of the present invention.

EXAMPLE 1

1:1 Polyacrylic acid:Chitosan Complex

To 812 g of 3.8% chitosan in 4% aqueous acetic acid was added 210 g of glacial acetic acid. 35 g of 50 % w/w low molecular weight (about 5000 weight average) polyacrylic acid in water (GOODRITE K-732, sold by G. F. Goodrich, Inc., Cleveland, Ohio), was added with rapid stirring. A clear, homogeneous, amber solution resulted.

The following example illustrates the criticality of employing low molecular weight polyacrylic acid.

EXAMPLE 1 A(Control)

1:1 Polyacrylic acid:Chitosan Complex

To 812 of 3.8% chitosan in 4% aqueous acetic acid was added 210 g of glacial acetic acid. 38.9 g of 45% w/w high molecular weight (about 104,000 weight average) polyacrylic acid in water (GOODRITE K-722 sold by B. F. Goodrich, Inc., Cleveland, Ohio), was added. Upon admixture an immediate precipitate was formed. The intractable mixture was found to be insoluble in 20% acetic acid, 50% acetic acid, glacial acetic acid, in hydrochloric acid and dimethyl sulfoxide.

Similar results were obtained substituting sodium carboxymethylcellulose and propylene glycol alginate for the polyacrylic acid in Example 1A.

The following non-limiting example illustrates the preparation of a self-supporting film within the scope of the present invention.

EXAMPLE 2

1:1 Polyacrylic acid:Chitosan Film

To the solution prepared in Example 1 was added 0.05% (weight basis) of a non-ionic surfactant (Neutronyx N-600, an alkylphenol polyglycol ether containing 9.5 moles ethylene oxide sold by Onyx Chemical Co., Jersey City, N.J.), and 1% glycerine as a plasticizer. An adjustable doctor blade was employed to draw down a layer 500 um thick on a polyester film base. The coating was dried at 60° C. to an optically clear, colorless film 25 um in thickness. The film was stripped from the support and was self-supporting.

The following non-limiting example illustrates the preparation of an anisotropic membrane within the scope of the present invention.

EXAMPLE 3

1:1 Polyacrylic acid:Chitosan Anisotropic Membrane

To the solution prepared in Example 1 was added 0.05% by weight of Neutronyx N-600. A doctor blade was employed to draw down a layer 250 um thick on a glass plate. The coating was immersed in a solution of 0.1N sodium hydroxide and allowed to soak for 30 seconds. The partially hardened film was then transferred to a water bath at 60° C. for about one hour to complete the hardening. The thus-formed membrane was plasticized by soaking in 15% glycerol solution for one hour. The membrane was approximately 125 um in total thickness and consisted of a thin skin over a relatively thick porous layer.

While polyelectrolyte complexes of virtually all ratios of polyacrylic acid and chitosan can be prepared, it has been found that films prepared from such complexes are soluble in neutral water with the exception of those having about a 1:1 stoichiometric ratio of polyacrylic acid and chitosan.

In order to evaluate the strength of the membrane of the present invention, a 12 um membrane, prepared according to the procedure of Example 2 was affixed to a rectangular side opening of a ¼ in. plastic tube. Water was circulated through the tubes and at 50 kPa the membrane ruptured. The membrane had expanded over 200% before rupturing.

As stated above, the polyelectrolyte complex of the present invention is particularly suited for use in membrane separation technology, i.e., as a film for dialysis, anisotropic membranes for reverse osmosis and ultrafiltration. The complexes are particularly useful because of high transfer rates and the low molecular weight cutoff achieved. The term "molecular weight cutoff", as used herein is intended to refer to that characteristic of a membrane to retain materials above a specified molecular weight value while passing material having a molecular weight below that value.

The following example illustrates a technique for determining the transport rates of the polyelectrolyte complex film of the present invention.

EXAMPLE 4

A film about 12 μm in thickness prepared according to the procedure of Example 2 was stretched over the open end of a glass tube 2.2 cm² cross section with a 20/40 ground glass joint and sealed with a slip ring. A fixed volume and head pressure was employed with an overhead glass stirrer in place for agitation. The tube was inserted in 400 ml deionized water which was also stirred. The composition of the dialysate was monitored with a conductivity cell. Potassium chloride solution (2N) at room temperature was placed into the tube. For comparison the same test was run on a control film, regenerated cellulose dialysis membrane, molecular weight cutoff of 1000 (SPECTRAPORE, sold by Spectrum Medical Industries, Los Angeles, Calif.).

The transport rates are recorded in the Table below. Both sides of the cell were stirred to prevent concentration polarization.

TABLE

| Film | Run No. | Salt Transport Rate kg KCL/m²/hr. |
|---|---|---|
| Control Film | A | 2.41 |
|  | B | 2.50 |
| Example 2 Film | C | 3.24 |
|  | D | 3.58 |

Films of the present invention are permeable to species including formaldehyde, potassium permanganate, sodium picrate, urea, silver nitrate, tetramethyl reductic acid, sodium borohydride and succindialdehyde. Retained species include glucose, glutaraldehyde and methylene blue.

EXAMPLE 5,6,7,8

Employing the procedures and materials of Examples 1 and 2 dry films were prepared having the following polyacrylic acid/chitosan molar ratios.

| Example 5 | 0.15/1 |
| Example 6 | 0.46/1 |
| Example 7 | 1.0/1 |
| Example 8 | 1.5/1 |

As stated above, all films except the one with the stoichiometric ratio, Example 7, were soluble in neutral water.

Membranes with the scope of the present invention perform separations even in the presence of organic solvent. The molecular weight cutoff of the films of the present invention is about 200. This separation capability is lower than anything found in the art with similar transport rates, e.g. cellophane has a molecular weight cutoff of about 1000.

What is claimed is:

1. As a novel composition of matter, a polyacrylic acid/chitosan complex, wherein the molecular weight (weight average) of said polyacrylic acid is less than about 10,000.

2. The product of claim 1 wherein said complex is about a 1:1 complex.

3. The product of claim 1 wherein said molecular weight (weight average) is about 5000.

4. The product of claim 1 wherein said complex is a film.

5. A product of claim 4 wherein said film is carried on a support.

6. The product of claim 4 wherein said film is self-supporting.

7. The product of claim 4 wherein said film includes a surfactant.

8. The product of claim 4 wherein said film includes a plasticizer.

9. The product of claim 8 wherein said plasticizer is a polyol.

10. The product of claim 9 wherein said polyol is glycerol.

11. A membrane comprising polyacrylic acid and chitosan, said membrane having a molecular weight (weight average) cutoff of about 200, wherein said polyacrylic acid has a molecular weight (weight average) of less than about 10,000.

12. The product of claim 11 wherein said polyacrylic acid and said chitosan are in a 1:1 ratio.

13. The product of claim 11 wherein said molecular weight (weight average) is about 5,000.

14. The product of claim 11 wherein said membrane is self-supporting.

15. The product of claim 11 wherein said membrane is carried on a support.

16. The product of claim 15 wherein said support is a permeable support.

17. The product of claim 11 which includes a surfactant.

18. The product of claim 11 which includes a plasticizer.

19. The product of claim 18 wherein said plasticizer is a polyol.

20. The product of claim 19 wherein said polyol is glycerol.

21. A method for preparing a membrane which comprises forming a polyelectrolyte complex by dissolving chitosan in an acid, adding a solution of polyacrylic acid having a molecular weight (weight average) of less than 10,000 thereto and coating a support with said complex.

22. The method of claim 21 which includes the step of removing the thus-formed membrane from said support.

23. The method of claim 21 wherein a surfactant is added to said complex prior to coating said support.

24. The method of claim 21 wherein a plasticizer is added to said complex prior to coating said support.

25. The method of claim 22 wherein said membrane is immersed in a plasticizer subsequent to removal from said support.

26. The method of claims 24 wherein said plasticizer is a polyol.

27. The method of claim 26 wherein said polyol is glycerol.

28. The method of claim 21 wherein said polyacrylic acid and said chitosan are in a 1:1 ratio.

29. The method of claim 21 wherein said molecular weight (weight average) is about 5,000.

30. The method of claim 21 wherein said acid is acetic acid.

31. The method of claim 21 wherein the molecular weight (weight average) cutoff of said membrane is about 200.

32. The method of claim 21 which includes the steps of air drying said coating to form a skin and then contacting said complex with dilute base for a time insufficient to extract said polyacrylic acid, whereby an anisotropic membrane is formed.

33. The method of claim 32 wherein said dilute base is about 0.1N sodium hydroxide.

34. The method of claim 32 which includes the step of washing said membrane with water.

* * * * *